United States Patent [19]
Roth

[11] 3,813,153
[45] May 28, 1974

[54] MOTION-PICTURE APPARATUS CAPABLE OF GENERATING AN ELECTRICAL SYNCHRONIZING SIGNAL FOR THE SYNCHRONIZATION OF A SOUND TRACK

[75] Inventor: Johann Roth, Schwabhausen, Germany

[73] Assignee: Braun Aktiengesellschaft, Frankfurt Main, Germany

[22] Filed: Oct. 13, 1972

[21] Appl. No.: 297,375

[52] U.S. Cl. ............................................... 352/12
[51] Int. Cl. ........................................... G03b 31/04
[58] Field of Search .......................... 352/12, 15, 19

[56] References Cited
UNITED STATES PATENTS
3,492,068   1/1970   Baron .................................. 352/12

*Primary Examiner*—Samuel S. Matthews
*Assistant Examiner*—Michael L. Gellner
*Attorney, Agent, or Firm*—Michael S. Striker

[57] ABSTRACT

A motion-picture apparatus includes a film transport arrangement, a first unit for generating a first periodic signal in response to operation of the film transport arrangement, and a second unit including a semiconductor element responsive to the first signal and operative for generating an at least approximately sinusoidal second signal whose frequency is directly proportional to the speed of film transport.

4 Claims, 3 Drawing Figures

MOTION-PICTURE APPARATUS CAPABLE OF GENERATING AN ELECTRICAL SYNCHRONIZING SIGNAL FOR THE SYNCHRONIZATION OF A SOUND TRACK

BACKGROUND OF THE INVENTION

The invention relates to an arrangement in a motion-picture apparatus for generating a sinusoidal control signal whose frequency is directly indicative of film transport speed, so that the control signal can be used to regulate the speed of transport of a sound carrier, for example to control the speed of transport of a magnetic-tape sound track during playback relative to the transport speed of film in the projector, or to control the speed of transport of the sound track during recording relative to the transport speed of the film in the projector.

Such an arrangement is already known and includes means operative for generating an approximately sinusoidal control frequency. That arrangement has basically the form of an A.C. generator, and furnishes a signal whose frequency is directly proportional to film speed.

However, this known arrangement has a number of significant disadvantages. The generator-type arrangement requires an undesirably high energy consumption, which is a particularly serious disadvantage inasmuch as many motion-picture cameras are furnished with energy from an ordinary battery, and for the sake of compactness it is desired that such batteries be kept as small as possible. The generator-type arrangement for furnishing the sinusoidal control signal, itself, occupies an undesirably large amount of room, and is expensive in construction, which of course is undesirable from the point of view of compactness and low cost.

SUMMARY OF THE INVENTION

It is the general object of the present invention to provide a photographic apparatus with means for generating an at least approximately sinusoidal control signal which is simpler, less expensive, less space-consuming and less consumptive of energy than the arrangements of the prior art.

These objects, and others which will become more understandable below, can be met according to the invention by a motion picture apparatus, either a camera or a projector, which includes film transport means, first means for generating a first periodic signal in response to operation of the film transport means, and second means including a semiconductor element responsive to said first signal and operative for generating an at least approximately sinusoidal second signal whose frequency is directly proportional to the speed of film transport.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
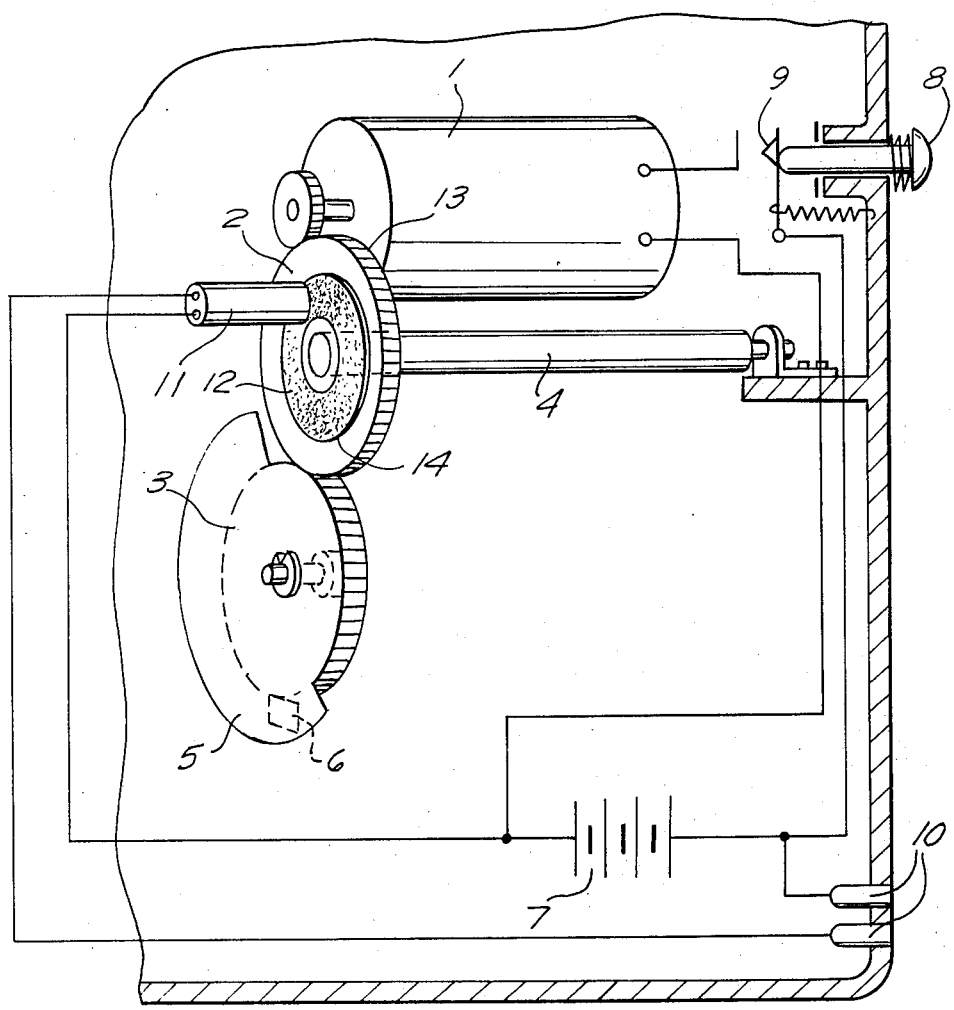
FIG. 1 is a view of a first embodiment of the invention.

FIG. 1 shows only so much of a motion picture camera as is necessary for an understanding of the invention. Reference numeral 1 designates the drive motor of the film transport means, and the output shaft of motor 1 drives gears 2 and 3 of the film transport arrangement. Neither the film transport arrangement in its entirety nor the film in the camera has been shown, inasmuch as such details need not be considered for an understanding of the invention.

In FIG. 1, reference numeral 4 designates the main rotating shaft of the film transport means, and it is noted incidentally that gears 2 and 3 have the same number of teeth. Numerals 5 and 6 respectively designate the somewhat schematically represented camera shutter and image aperture. Numeral 8 identifies the manual camera activator button, depression of which closes electrical contact 9 and initiates operation of drive motor 1.

The camera housing has two sockets 10 into which will be plugged the non-illustrated plug of a non-illustrated sound-recording unit. By means of circuitry in the camera, still to be described, the camera will furnish to the soundrecording units, via jacks 10, a sinusoidal control frequency for regulating the speed of transport of the sound carrier, so as to assure the possibility of synchronizing the sound carrier with the motion-picture film. A further non-illustrated switch may be provided in addition to the switch 9 for initiating operation of the sound-recording unit simultaneously with the initiation of operation of the camera.

Numeral 7 designates the battery of the camera. Numeral 11 designates a magnetic-field-responsive semiconductor element having one terminal connected to one terminal of battery 7 and another terminal connected to one of jacks 10. Magnetic-field-responsive semiconductor element 11, in this embodiment, has a resistance which varies in direct response to variations in the magnetic field in the immediate vicinity of the element. It will be noted that element 11 is positioned in close proximity to one axial end face of rotating member 2. Mounted on rotating member 2 for rotation therewith is a disk-shaped magnetic member 12 having a north pole 13 and a south pole 14 which are located diametrically opposite each other, with reference to the axis of rotation of member 2 and the disk 12. The magnetic field strength varies approximately sinusoidally in direction circumferentially of the axis of rotation of magnetic disk 12. Accordingly, as gear 2 turns during film transport, magnetic disk 12 will so move relative to field-responsive element 11 as to establish in the immediate vicinity of element 11 a magnetic field whose strength varies sinusoidally upon operation of the film transport means. Accordingly, during transport of film in the motion-picture camera, the electrical resistance of semiconductor element 11 will vary, and a sinusoidal control signal will be generated at jack terminals 10.

Figure 2:
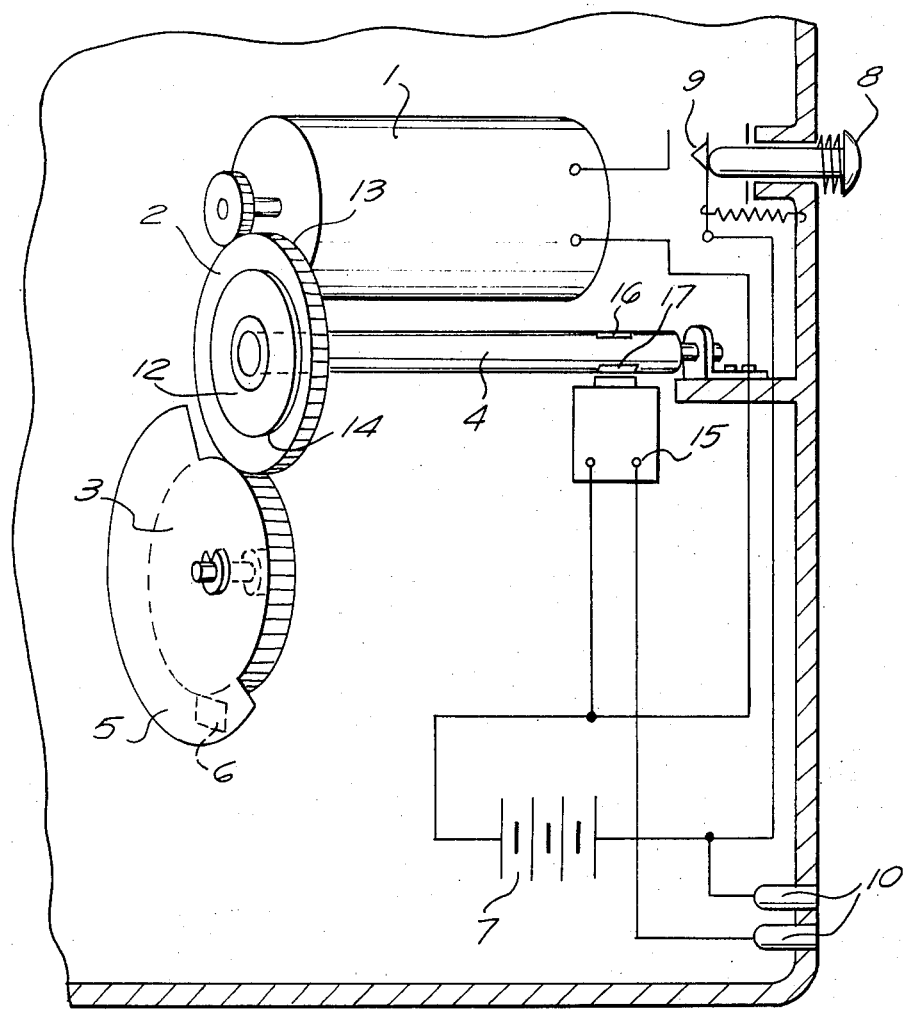
FIG. 2 is a view of a second embodiment of the invention.

FIG. 2 shows another embodiment of this concept. Here, the magnetic-field-responsive semiconductor element is identified with numeral 15. Moreover, the magnetic field in the immediate vicinity of element 15, in this embodiment, is established by the magnetized periphery of drive shaft 4, indicated in the drawing by shaded portions 16 and 17, one of which is a north pole and the other of which is a south pole. The magnetization of this axially limited portion of the periphery of shaft 4 is such that as shaft 4 turns, the magnetic field in the immediate vicinity of element 15 will vary sinusoidally. As in the case of FIG. 1, the desired sinusoidal control signal will be furnished at the jack terminals 10, inasmuch as the electrical resistance of element 15 will change in direct correspondence to the variations in field strength. Clearly, the frequency of the sinusoidal control signal will be directly proportional to the rotational speed of shaft 4. In the embodiment of FIG. 2, for example, two sine-wave cycles will be generated per revolution of shaft 4, so that if a control frequency of 50 Hz is desired, the rotational speed of shaft 4 will be chosen accordingly.

Figure 3:
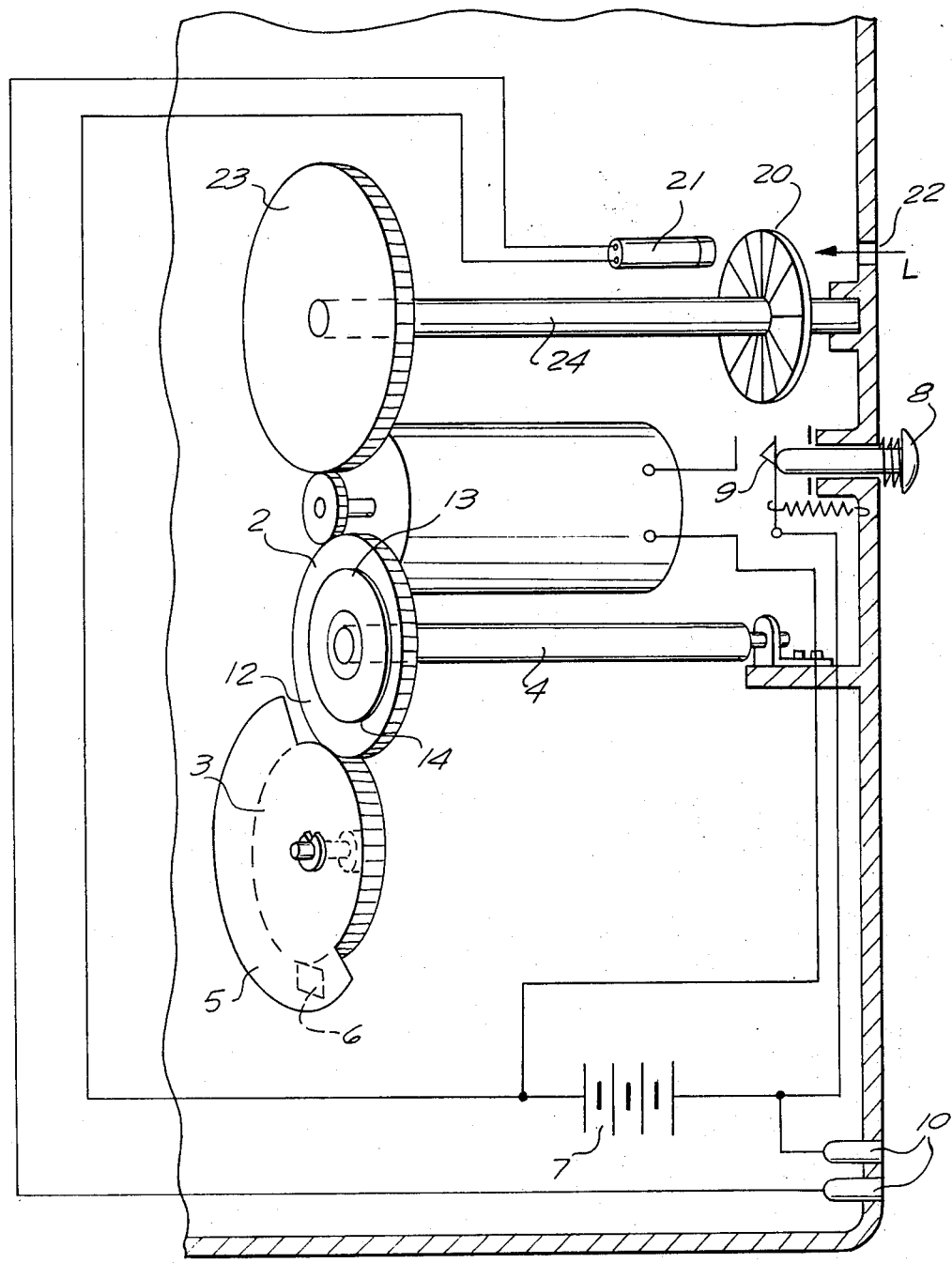
FIG. 3 is a view of a third embodiment of the invention.

FIG. 3 shows a third embodiment of the invention. In FIG. 3, the camera housing is provided with an auxiliary light aperture 22 through which a ray of light L enters a closed-off portion of the camera interior. (Obviously, the light ray L should not be permitted to fall upon the film).

Positioned in the path of light ray L is a photosensitive semiconductor element 21 whose electrical resistance varies as a function of the amount of light incident upon the element 21. A light-regulating means 20, here a translucent disk is provided between element 21 and light-aperture 22. The translucency of the disk 20 varies in direction circumferentially of the axis of rotation of the disk. Moreover the disk is connected to driven gear 23 by a shaft 24. Accordingly, when film transport motor 1 turns, turning gear 23 and shaft 24, light-regulating disk 20 will turn varying the lightfall upon semiconductor element 21. The configuration of the light-transmissive portions of the disk is such that as the disk turns the variation in the light incident upon element 21 will be sinusoidal. As one advantageous possibility, light-regulating disk 20 may include a plurality of discrete light-limiting portions, whose respective translucencies vary from one portion to the next approximately sinusoidally in direction circumferentially of the disk. Also, however, the light transmissivity of the disk may vary continuously and sinusoidally in direction circumferentially of the disk. As film transport motor 1 rotates, the desired sinusoidal control signal will be provided at jack terminals 10, as in the other embodiments.

It will be understood that each of the elements described above, or two or more together, may also find a useful application in other types of constructions differing from the types described above.

While the invention has been illustrated and described as embodied in synchronizing arrangements for use with sound motion-picture apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a motion-picture apparatus, in combination, film transport means, first means for generating a first periodic signal in response to operation of said film transport means; and second means including a semiconductor element responsive to said first signal and operative for generating an at least approximately sinusoidal second signal whose frequency is directly proportional to the speed of film transport, wherein said film transport means includes at least one rotating member, and wherein said semiconductor element is a stationarily positioned magnetic-field-responsive semiconductor element, and wherein said first means comprises a magnetic member mounted on said rotating member for rotation therewith and located in proximity to said element and having a field distribution such as to establish in the immediate vicinity of said element a magnetic field which periodically increases and decreases in response to rotation of said rotating member during operation of said film transport means, and wherein said magnetic member is a rotating disk magnetized at one axial end face thereof.

2. In a motion-picture apparatus, in combination, film transport means; first means for generating a first periodic signal in response to operation of said film transport means; and second means including a semiconductor element responsive to said first signal and operative for generating an at least approximately sinusoidal second signal whose frequency is directly proportional to the speed of film transport, wherein said semiconductor element is a light-sensitive semiconductor element located in a light path in said camera, and wherein said first means comprises means for periodically increasing and decreasing the amount of light incident upon said light-sensitive semiconductor element with a frequency directly corresponding to the speed of film transport.

3. In a motion picture apparatus as defined in claim 2, wherein said film transport means includes at least one rotating member, and wherein said means for periodically increasing and decreasing said amount of light comprises a disk-shaped member mounted for rotation with said rotating member and adapted to vary the amount of light incident upon said element.

4. In a motion picture apparatus as defined in claim 3, wehrein said disk-shaped member is at least in part of translucent material and has a translucency which varies in direction circumferentially of the axis of rotation of said disk-shaped member.

* * * * *